(12) United States Patent
Zhu et al.

(10) Patent No.: US 12,508,585 B2
(45) Date of Patent: Dec. 30, 2025

(54) BIOLOGICAL TEST CASSETTES AND MEDICAL TEST SYSTEMS

(71) Applicant: GUANGZHOU WONDFO BIOTECH CO., LTD., Guangzhou (CN)

(72) Inventors: Zhihua Zhu, Guangzhou (CN); Jie Huang, Guangzhou (CN); Jiangfeng Li, Guangzhou (CN)

(73) Assignee: GUANGZHOU WONDFO BIOTECH CO., LTD., Guangzhou (CN)

( * ) Notice: Subject to any disclaimer, the term of this patent is extended or adjusted under 35 U.S.C. 154(b) by 878 days.

(21) Appl. No.: 17/751,896

(22) Filed: May 24, 2022

(65) Prior Publication Data

US 2022/0371007 A1 Nov. 24, 2022

(30) Foreign Application Priority Data

May 24, 2021 (CN) .......................... 202110566079.4

(51) Int. Cl.
*B01L 3/00* (2006.01)

(52) U.S. Cl.
CPC ..... *B01L 3/5027* (2013.01); *B01L 2300/0618* (2013.01); *B01L 2300/0851* (2013.01); *B01L 2300/123* (2013.01)

(58) Field of Classification Search
CPC ........... B01L 3/5027; B01L 2300/0618; B01L 2300/0851; B01L 2300/123
See application file for complete search history.

(56) References Cited

U.S. PATENT DOCUMENTS

| 9,079,182 | B2 | 7/2015 | De Gier et al. |
| 2004/0101444 | A1 | 5/2004 | Sommers et al. |
| 2004/0219661 | A1 | 11/2004 | Chen et al. |
| 2010/0304498 | A1 | 12/2010 | Sando et al. |

(Continued)

FOREIGN PATENT DOCUMENTS

| CN | 112442440 A | 3/2021 |
| CN | 215525806 U | 1/2022 |

(Continued)

OTHER PUBLICATIONS

Indian Office Action for Indian Counterpart Application No. 202234029792, mailed Mar. 16, 2023, (6 pages).

(Continued)

*Primary Examiner* — Jill A Warden
*Assistant Examiner* — Alex Ramirez
(74) *Attorney, Agent, or Firm* — Kagan Binder, PLLC

(57) ABSTRACT

The present disclosure relates to a biological test cassette and a medical test system, the biological test cassette comprising a support, a cassette body, a chip, a first connecting tube and a second connecting tube. The support is provided with a first via hole. The cassette body is provided with a second via hole corresponding to the position of the first via hole, mounted on a top surface of the support, and further provided with a pretreatment chamber and a first flow channel in communication with the pretreatment chamber. The chip is slidably provided on a bottom surface of the support, and provided with an analyzing and processing chamber and a second flow channel in communication with the analyzing and processing chamber. The second connecting tube can be freely bent and deformed during the process of pulling the chip out from or pushing the chip back into the support.

9 Claims, 7 Drawing Sheets

(56) References Cited

U.S. PATENT DOCUMENTS

| | | |
|---|---|---|
| 2012/0040470 A1 | 2/2012 | Dorn et al. |
| 2016/0107157 A1 | 4/2016 | Haghgooie et al. |
| 2018/0280975 A1 | 10/2018 | Kilcoin et al. |
| 2021/0060557 A1 | 3/2021 | Chiou et al. |

FOREIGN PATENT DOCUMENTS

| | | |
|---|---|---|
| WO | 2010115531 A1 | 10/2010 |
| WO | 2011147421 A1 | 12/2011 |

OTHER PUBLICATIONS

Extended European Search Report for European Counterpart Application No. 22175235.5, mailed Nov. 2, 2022, (5 pages).
Chinese Office Action for Chinese Counterpart Application No. 202110566079.4 mailed Oct. 28, 2024, 9 pages (Office Action lists the U.S. Patent Application Publications and Foreign Patent Documents listed herein).

BIOLOGICAL TEST CASSETTES AND MEDICAL TEST SYSTEMS

CROSS-REFERENCE TO RELATED APPLICATION

This application claims the benefit of priority of Chinese Patent Application No. 202110566079.4, filed May 24, 2021, the content of which is incorporated by reference in its entirety for all purposes.

TECHNICAL FIELD

The present disclosure relates to the technical field of medical devices, in particular to a biological test cassette and a medical test system.

BACKGROUND

Conventionally, some highly integrated disposable biological test cassettes usually require segmented processing, testing and analysis for liquid samples or gaseous samples. For example, a biological sample needs to be pretreated by heating and incubation, mixing, purification, addition of components, and filtration etc. in a pretreatment chamber before its testing and analysis. After pretreatment, the mixed sample can be analyzed optically, or analyzed and processed otherwise. Generally, optical analysis or other analysis and processing have special requirements for the chamber where the sample is placed, or it is necessary to transfer the sample in fluid form from the pretreatment chamber to another suitable analyzing and processing chamber due to the size limitation of the cassette. The pretreatment chamber and the analyzing and processing chamber are respectively provided in two different elements. In order to achieve the transfer of the sample in fluid form between the chambers in the two different elements, pressure contact between two structural elements (e.g., a flexible element and a rigid element) is usually adopted for the sealing of the docking channel between the different elements. Thus, the structure is complex, and requires extremely high processing or forming accuracy for the relevant seals. Such a biological test cassette has a very high failure rate and higher cost.

SUMMARY

Accordingly, it is necessary to overcome the defects in the prior art and provide a biological test cassette and a medical test system, which may have simplified product structure, reduced requirements for product processing accuracy, improved product qualification rate and lower cost.

The technical solution is provided as follows: a biological test cassette, comprising: a support and a cassette body, wherein the support is provided with a first via hole, the cassette body is provided with a second via hole corresponding to the position of the first via hole, the cassette body is mounted on a top surface of the support, and the cassette body is further provided with a pretreatment chamber and a first flow channel in communication with the pretreatment chamber; a chip, a first connecting tube and a second connecting tube, wherein the chip is slidably provided on a bottom surface of the support, the chip is provided with an analyzing and processing chamber and a second flow channel in communication with the analyzing and processing chamber, the first connecting tube is arranged through the first via hole and the second via hole, and has one end in communication with the first flow channel, and the other end in communication with one end of the second connecting tube, the second connecting tube is a flexible tube that is movable and bendable between the chip and the support, and has the other end in communication with the second flow channel.

In the biological test cassette as described above, the chip, under push-pull driving action by an external driving device, can be slidably pulled out from the support. After the chip is pulled out, a series of analysis and processing operations can be performed for the liquid in the analyzing and processing chamber of the chip by an external testing device. After the analysis and processing operations are completed, the chip can also be slidably pushed back into the support, which can prevent the chip from being exposed and damaged. Since the second flow channel of the chip and the first flow channel of the cassette body are communicated by the first connecting tube and the second connecting tube, and the second connecting tube is a flexible tube that is movable and bendable between the chip and the support, the second connecting tube can be freely bent and deformed accordingly during the process of pulling the chip out from or pushes the chip back into the support by the driving device, not only satisfying the requirement for the chip to be slidably pulled out from and pushed back into the support, but also ensuring that the second connecting tube is unobstructed. Thus, the liquid in the first flow channel can smoothly enter the second flow channel and the analyzing and processing chamber through the first connecting tube and the second connecting tube.

In an embodiment, the bottom surface of the support is provided with a first concave portion, the first concave portion having a shape that is adapted to the shape of the chip and a side wall provided with a first movable port for the chip to slide out; the chip is provided with a docking portion that protrudes out of the first concave portion through the first movable port.

In an embodiment, the bottom surface of the support is provided with a first bump, the chip is provided with a second bump, and the first bump and/or the second bump are elastic bumps; when the chip is located at a starting position, the first bump abuts against and fits with the second bump to restrict the movement of the chip in the direction of pulling out.

In an embodiment, two first bumps and two second bumps are provided; the two second bumps are located on both sides of the chip respectively, and the two second bumps are arranged in a one-to-one correspondence with the two first bumps.

In an embodiment, the biological test cassette further comprises a press cover covering the chip and fitting with the bottom surface of the support to form a slot, and the chip is slidably disposed in the slot.

In an embodiment, the bottom surface of the support is provided with a second concave portion, and the second connecting tube is movable and bendable in the second concave portion.

In an embodiment, the second concave portion has a bottom wall provided with a boss; the boss is located on the bottom surface of the support at a side where the chip slides out; when the chip slides out to an end position, the boss resists against the second connecting tube.

In an embodiment, the biological test cassette further comprises a first rigid tube provided between the first connecting tube and the first flow channel, the first connecting tube is in communication with the first flow channel through the first rigid tube; the cassette body is provided with a first mounting hole, and the first rigid tube is fixedly mounted in the first mounting hole;

the biological test cassette further comprises a second rigid tube provided between the second connecting tube and the second flow channel, the second connecting tube is in communication with the second flow channel through the second rigid tube, the chip is provided with a second mounting hole, and the second rigid tube is mounted in the second mounting hole.

In an embodiment, the biological test cassette further comprises an upper cover covering the cassette body.

A medical test system comprises the biological test cassette.

In the medical test system as described above, the chip, under push-pull driving action by an external driving device, can be slidably pulled out from the support. After the chip is pulled out, a series of analysis and processing operations can be performed for the liquid in the analyzing and processing chamber of the chip by an external testing device. After the analysis and processing operations are completed, the chip can also be slidably pushed back into the support, which can prevent the chip from being exposed and damaged. Since the second flow channel of the chip and the first flow channel of the cassette body are communicated by the first connecting tube and the second connecting tube, and the second connecting tube is a flexible tube that is movable and bendable between the chip and the support, the second connecting tube can be freely bent and deformed accordingly during the process of pulling the chip out from or pushes the chip back into the support by the driving device, not only satisfying the requirement for the chip to be slidably pulled out from and pushed back into the support, but also ensuring that the second connecting tube is unobstructed. Thus, the liquid in the first flow channel can smoothly enter the second flow channel and the analyzing and processing chamber through the first connecting tube and the second connecting tube.

BRIEF DESCRIPTION OF THE DRAWINGS

The accompanying drawings constituting a part of the present application are for the purpose of providing further understanding of the present disclosure, and the exemplary embodiments and their descriptions of the present disclosure are for the purpose of explaining the present disclosure and will not improperly limit the present disclosure.

To illustrate the technical solutions in the embodiments of the present disclosure or in the prior art more clearly, the following briefly introduces the accompanying drawings required for describing the embodiments. The accompanying drawings in the following description show merely some embodiments of the present disclosure, and persons of ordinary skill in the art may still derive other drawings from these accompanying drawings without creative efforts.

10. support; 11. first via hole; 12. bottom surface; 13. top surface; 14. first concave portion; 15. first movable port; 16. first bump; 17. avoidance groove; 18. second concave portion; 181. boss; 182. first gap; 183. second gap; 191. first engaging component; 192. the second engaging hole; 20. cassette body; 21. second via hole; 22. pretreatment chamber; 23. first flow channel; 24. first engaging hole; 30. chip; 31. analyzing and processing chamber; 32. second flow channel; 33. docking portion; 34, second bump; 40, first connecting tube; 50, a second connecting tube; 60, press cover; 61, slot; 62, second engaging component; 71, first rigid tube; 72, second rigid tube; 80, upper cover.

DETAILED DESCRIPTION OF THE EMBODIMENTS

In order to make the above objects, features and advantages of the present disclosure apparent, the specific embodiments of the present disclosure will be described in detail below with reference to the accompanying drawings. Many specific details are provided in the following description, so as to facilitate the full comprehension of the disclosure. However, the disclosure may be implemented by using many other ways different from those described herein; and those skilled in the art can make similar improvements without departing from the conception of the present disclosure. Therefore, the present disclosure is not limited to the following disclosed specific implementations.

Figure 1:
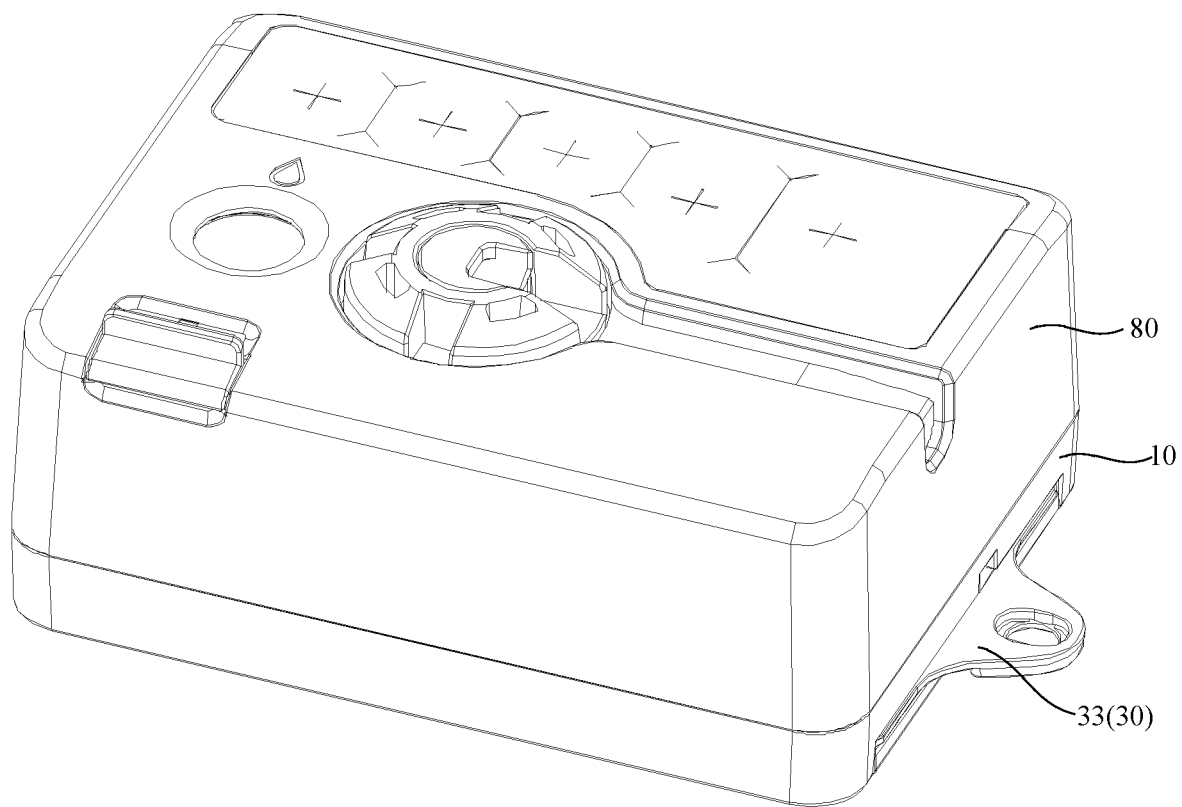
FIG. 1 is a schematic structural diagram of a biological test cassette according to an embodiment of the present disclosure.
Figure 2:
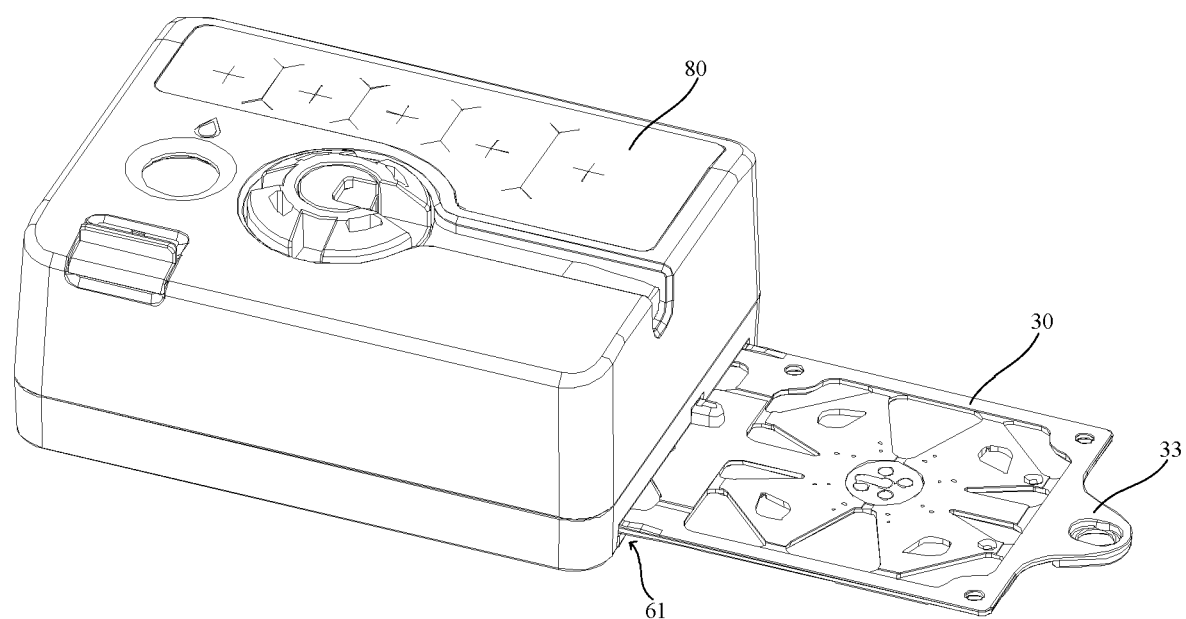
FIG. 2 is a schematic structural diagram of the biological test cassette in FIG. 1 with the chip pulled out.
Figure 6:
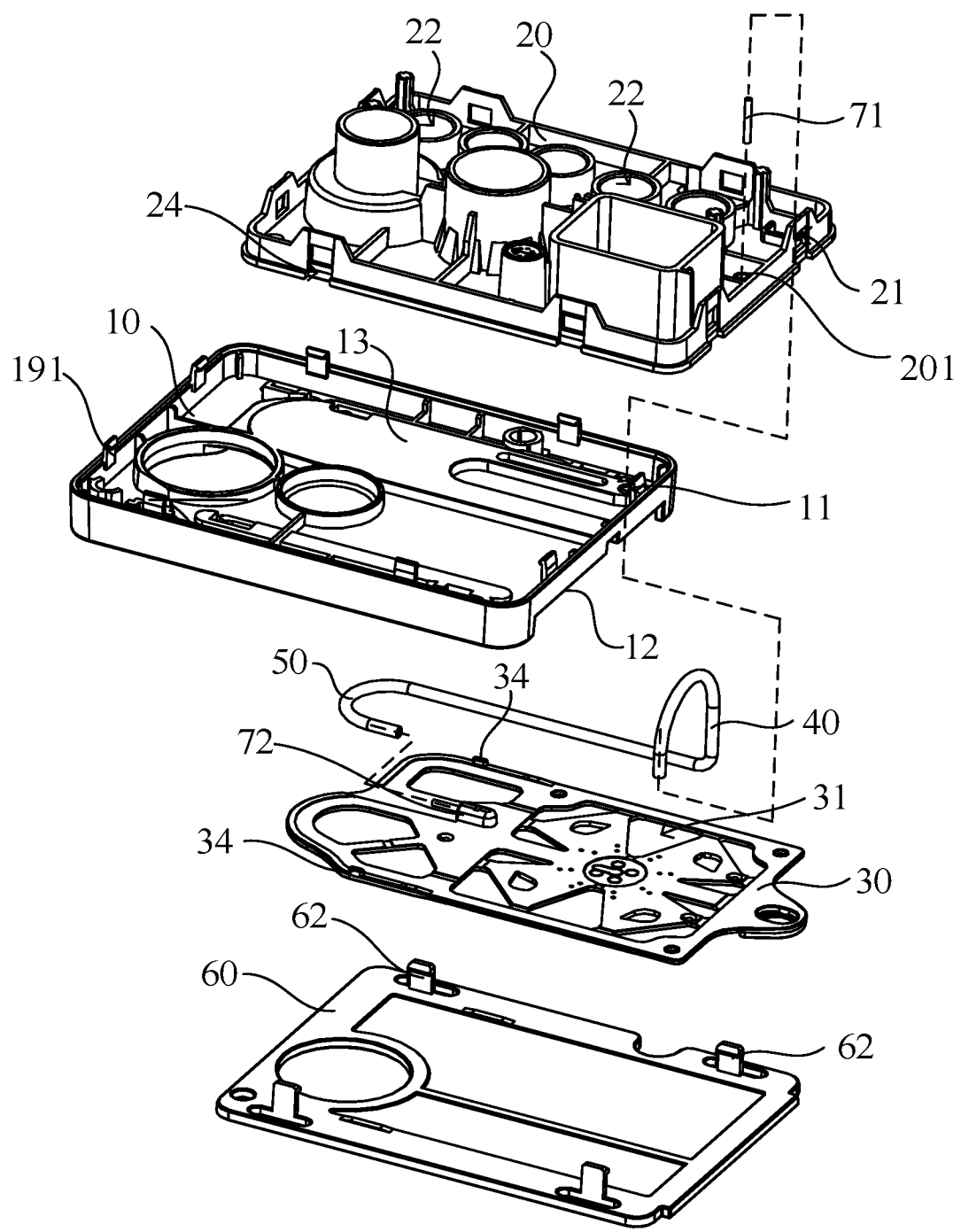
FIG. 6 is a schematic exploded structural diagram of a biological test cassette according to an embodiment of the present disclosure.
Figure 7:
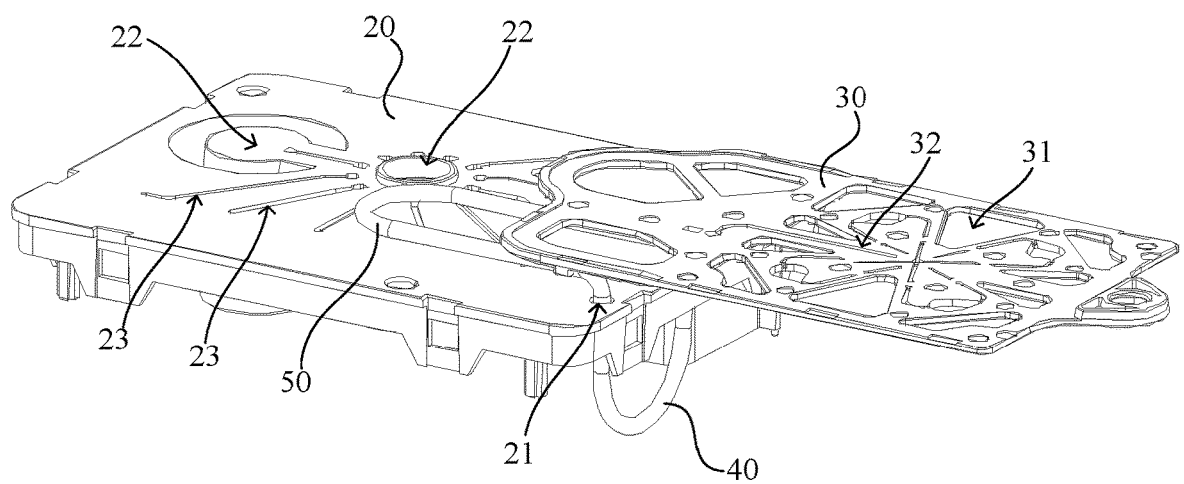
FIG. 7 is a schematic structural diagram of the cassette body and the chip in a biological test cassette according to an embodiment of the present disclosure.

Referring to FIGS. 1, 2, 6 and 7, FIG. 1 shows a schematic structural diagram of a biological test cassette according to an embodiment of the present disclosure, FIG. 2 shows a schematic structural diagram of the biological test cassette in FIG. 1 with the chip 30 pulled out, FIG. 6 shows a schematic exploded structural diagram of a biological test cassette according to an embodiment of the present disclosure, and FIG. 7 shows a schematic structural diagram of the cassette body 20 and the chip 30 in a biological test cassette according to an embodiment of the present disclosure. An embodiment of the present disclosure provides a biological test cassette, the biological test cassette comprising a support 10, a cassette body 20, a chip 30, a first connecting tube 40 and a second connecting tube 50.

The support 10 is provided with a first via hole 11. The cassette body 20 is provided with a second via hole 21 corresponding to the position of the first via hole 11, the cassette body 20 is mounted on a top surface 13 of the support 10, and the cassette body 20 is further provided with a pretreatment chamber 22 and a first flow channel 23 in communication with the pretreatment chamber 22, as shown in FIG. 7. The chip 30 is slidably provided on a bottom surface 12 of the support 10, the chip 30 is provided with an analyzing and processing chamber 31 and a second flow channel 32 in communication with the analyzing and processing chamber 31. The first connecting tube 40 is arranged through the first via hole 11 and the second via hole 21, and has one end in communication with the first flow channel 23, and the other end of the first connecting tube 40 in communication with one end of the second connecting tube 50. The second connecting tube 50 is a flexible tube that is movable and bendable between the chip 30 and the support 10, and has the other end in communication with the second flow channel 32.

In the biological test cassette as described above, the chip 30, under push-pull driving action by an external driving device, can be slidably pulled out from the support 10. After the chip 30 is pulled out, a series of analysis and processing operations can be performed for the liquid in the analyzing and processing chamber 31 of the chip 30 by an external testing device. After the analysis and processing operations are completed, the chip 30 can also be slidably pushed back into the support 10, which can prevent the chip 30 from being exposed and damaged. Since the second flow channel 32 of the chip 30 and the first flow channel 23 of the cassette body 20 are communicated by the first connecting tube 40 and the second connecting tube 50, and the second connecting tube 50 is a flexible tube that is movable and bendable between the chip 30 and the support 10, the second connecting tube 50 can be freely bent and deformed accordingly during the process of pulling the chip 30 out from or pushes the chip 30 back into the support 10 by the driving device, not only satisfying the requirement for the chip 30 to be slidably pulled out from and pushed back into the support 10, but also ensuring that the second connecting tube 50 is unobstructed. Thus, the liquid in the first flow channel 23 can smoothly enter the second flow channel 32 and the analyzing and processing chamber 31 through the first connecting tube 40 and the second connecting tube 50.

It should be noted that the cassette body 20 may be provided with one or more pretreatment chambers 22 for, and further with one or more first flow channels 23. Their specific numbers are determined as actual needs without limitation herein. Besides, the chip 30 may be provided with one or more analyzing and processing chamber 31, and also with one or more second flow channels 23. Their specific numbers are determined as actual needs without limitation herein.

It should be noted that the "first connecting tube 40" can be "a part of the second connecting tube 50", that is, the "first connecting tube 40" is integrated with "other parts of the second connecting tube 50"; or can alternatively be an separated component that is separable from the "other parts of the second connecting tube 50", that is, the "first connecting tube 40" can be manufactured separably, and then assembled with the "other parts of the second connecting tube 50" as a whole. As shown in FIG. 6, in one embodiment, the "first connecting tube 40" is a part of the "second connecting tube 50" which is integrally formed.

Figure 3:
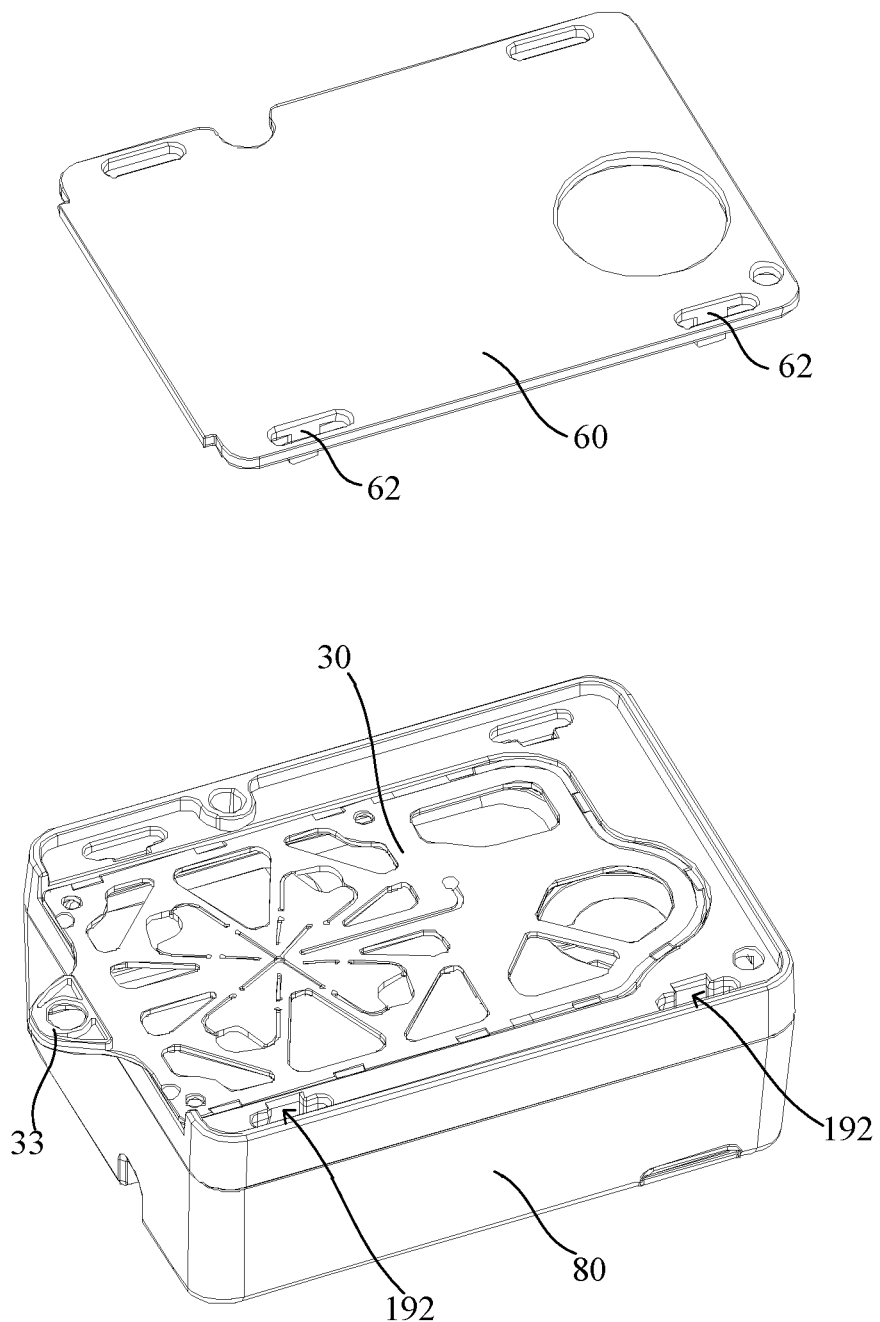
FIG. 3 is a schematic structural diagram of a biological test cassette with the chip located on the support and the press cover separated according to an embodiment of the present disclosure.
Figure 4:
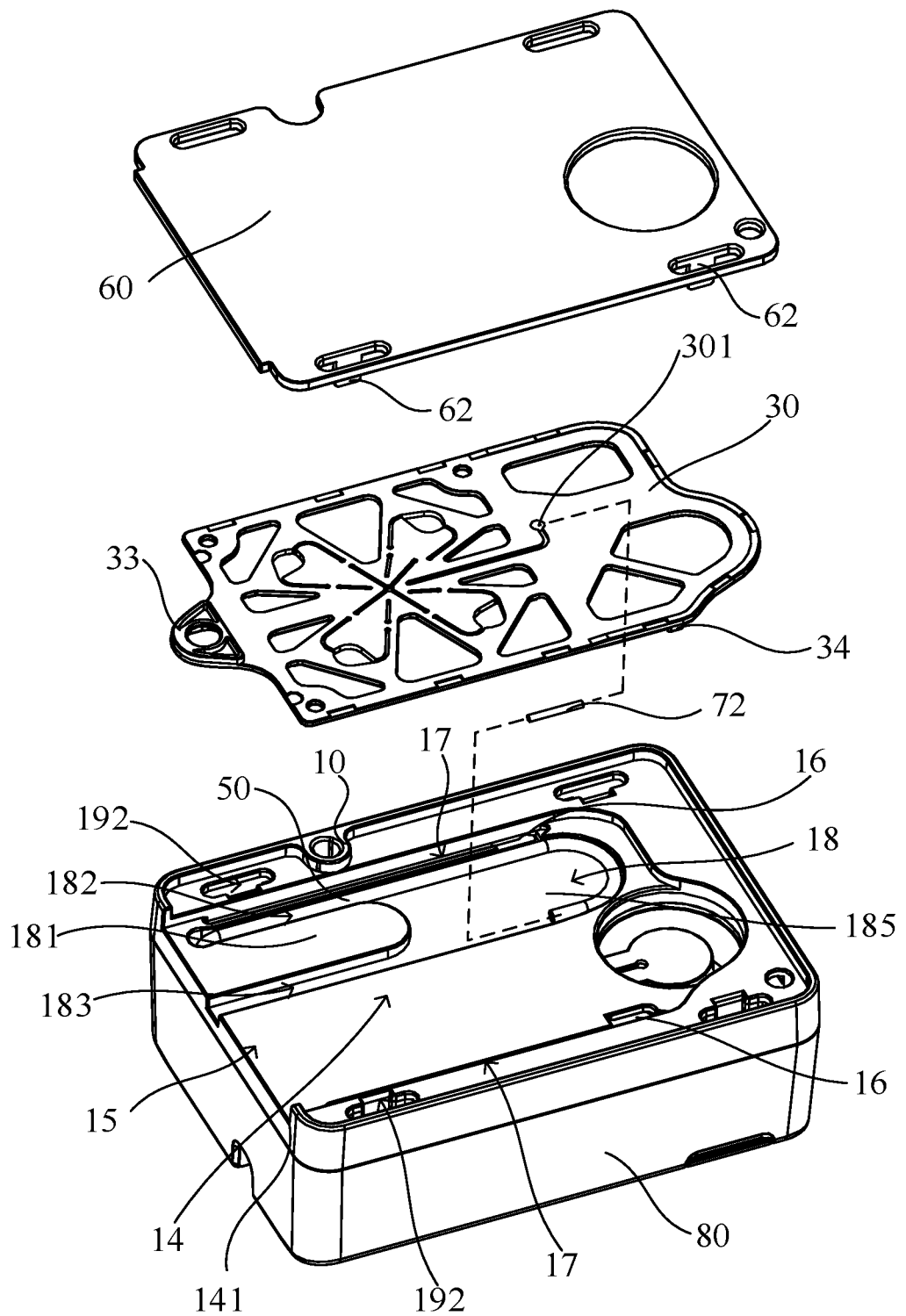
FIG. 4 is a schematic structural diagram of a biological test cassette with the press cover separated from the chip according to an embodiment of the present disclosure.

Referring to FIGS. 3 and 4, FIG. 3 shows a schematic structural diagram of a biological test cassette with the chip 30 located on the support 10 and the press cover 60 separated according to an embodiment of the present disclosure, and FIG. 4 shows a schematic structural diagram of a biological test cassette with the press cover 60 separated from the chip 30 according to an embodiment of the present disclosure. In one embodiment, the bottom surface 12 of the support 10 is provided with a first concave portion 14 having a shape that is adapted to the shape of the chip 30. The first concave portion 14 has a side wall 141 provided with a first movable port 15 for the chip 30 to slide out. Further, the chip 30 is provided with a docking portion 33 that protrudes out of the first concave portion 14 through the first movable port 15. Thus, on the one hand, since the chip 30 has a shape that is adapted to that of the first concave portion 14, the chip 30, under the push-pull action by an external driving device, can be easily slidably pulled out through the first movable port 15 along the first concave portion 14 and can also be easily pushed back into the first concave portion 14 along the first concave portion 14, thus the chip 30 has better running stability; on the other hand, when the chip 30 is located in the first concave portion 14, the docking portion 33 of the chip 30 protrudes out of the first concave portion 14 through the first movable port 15, facilitating the external driving device to act on the docking portion 33 of the chip 30 and pull the chip 30 out along the first concave portion 14 conveniently. In order to facilitate the docking of the docking portion 33 with a driving end of the external driving device, the docking portion 33 is provided with docking holes, docking protrusions, etc.

Figure 5:
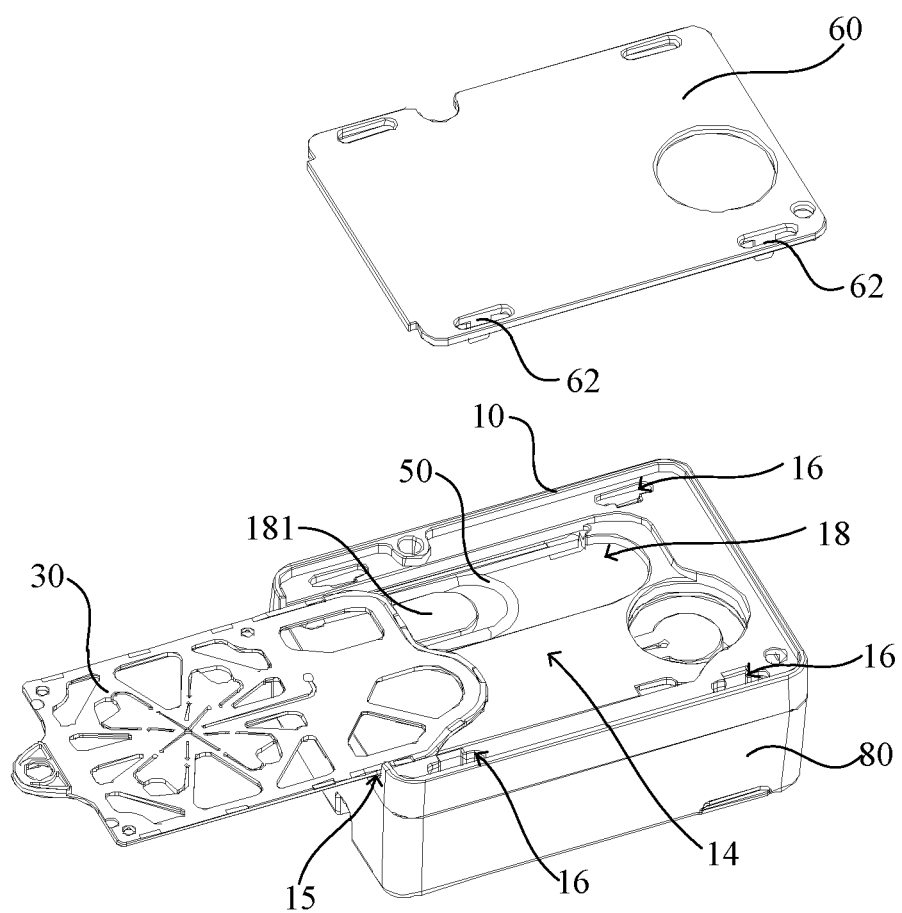
FIG. 5 is a schematic structural diagram of a biological test cassette with the chip pulled out and the press cover separated according to an embodiment of the present disclosure.

Referring to FIGS. 4 to 6, FIG. 5 is a schematic structural diagram of a biological test cassette with the chip 30 pulled out and the press cover 60 separated according to an embodiment of the present disclosure. In one embodiment, the bottom surface 12 of the support 10 is provided with a first bump 16, the chip 30 is provided with a second bump 34, and the first bump 16 and/or the second bump 34 are elastic bumps. When the chip 30 is located at a starting position, the first bump 16 abuts against and fits with the second bump 34 to restrict the movement of the chip 30 in the direction of pulling out.

It should be noted that a starting position (the position corresponding to where the chip located as shown in FIG. 3) and an end position (the position corresponding to where the chip located as shown in FIG. 5) are provided for the chip 30. The chip 30 is located at the starting position when the chip 30 is not pulled out from the support 10 or when the chip 30 is pushed back into the support 10 under the push-pull action by the driving device; the chip 30 is located at the end position correspondingly when the chip 30 is pulled out from the support 10 under the push-pull action by the driving device.

Referring to FIGS. 4 to 6, when the chip 30 is located at the starting position, the first bump 16 abuts against and fits with the second bump 34 to restrict the movement of the chip 30 in the direction of pulling out. As such, the chip 30 will generally not easily slide out from the support 10, that is, the chip 30 is well-positioned, which can prevent the chip 30 from being damaged due to outward movement, which, for example, leads to leakage from the second flow channel 32 or the analyzing and processing chamber 31. The chip 30, of course, will be deformed correspondingly when the elastic bump is subjected to a sufficient pulling force under the push-pull action of the driving device, that is, the chip 30 can be smoothly pulled out from the support 10 and can also return to the starting position.

Alternatively, one of the first bump 16 and the second bump 34 as described above can be replaced by a positioning hole, and the other one of the first bump 16 and the second bump 34 is correspondingly configured to be an elastic bump that is insertable into the positioning hole.

Referring to FIGS. 4 to 6, in one embodiment, two first bumps 16 and two second bumps 34 are provided. The two second bumps 34 are located on both sides of the chip 30 respectively, and the two second bumps 34 are arranged in a one-to-one correspondence with the two first bumps 16. Thus, the chip 30, when is located at a starting position, can be well-positioned in the support 10 by having the two first bumps 16 abut against and fit with the two second bumps 34 respectively. Specifically, if the second bump 34 is located on a side of the chip 30 facing the bottom surface 12 of the support 10, the bottom surface 12 of the support 10 is provided with an avoidance groove 17, and the second bump 34 is disposed in the avoidance groove 17 and can move along the avoidance groove 17, in order to allow the second bump 34 to avoid and ensure that the chip 30 can be smoothly slid on the bottom surface 12 of the support 10 so as to be pulled out from or push back into the support 10. Since the avoidance groove 17 only needs to allow the second bump 34 to avoid and to move along the avoidance groove 17, the avoidance groove 17 is designed with a narrow width and a line groove shape, so that the second bump 34 moves along the avoidance groove 17, and the avoidance groove 17 can also play a certain guiding role for the chip 30.

Referring to FIGS. 2 to 4, in one embodiment, the biological test cassette further comprises a press cover 60. The press cover 60 covers the chip 30 and fits with the bottom surface 12 of the support 10 to form a slot 61, and the chip 30 is slidably disposed in the slot 61. Thus, the press cover 60 can prevent the chip 30 from falling down and protect the chip 30 when the chip 30 is located in the active slot 61.

Referring to FIGS. 3 to 5, in one embodiment, the bottom surface 12 of the support 10 is provided with a second concave portion 18, and the second connecting tube 50 that is movable and bendable in the second concave portion 18. Thus, when the chip 30 moves along the bottom surface 12 of the support 10, the second connecting tube 50 can smoothly move and self-deform in the second concave portion 18, not only satisfying the requirement for the chip 30 to be slidably pulled out from and pushed back into the support 10, but also ensuring that the second connecting tube 50 is unobstructed. Thus, the liquid in the first flow channel 23 can smoothly enter the second flow channel 32 and the analyzing and processing chamber 31 through the first connecting tube 40 and the second connecting tube 50.

Referring to FIGS. 3 to 5, in one embodiment, the second concave portion 18 has a bottom wall 185 provided with a boss 181. The boss 181 is located on the bottom surface 12 of the support 10 at the side where the chip 30 slides out; when the chip 30 slides out to the end position, the boss 181 resists against the second connecting tube 50. Thus, when the chip 30 slides out to the end position, the boss 181 resists against the second connecting tube 50, so that the chip 30 can be prevented from continuing to slide out. Specifically, the boss 181 has one side that fits with an inner wall at one side of the concave portion to form a first gap 182, and the other side that fits with an inner wall at the opposite other side of the concave portion to form a second gap 183. The first gap 182 is adapted to one end of the second connecting tube 50. The second connecting tube 50 has one end that is movably provided in the first space 182, and has the other end to which the second space 183 is adapted and that is movably provided in the second gap 183.

Referring to FIGS. 4 and 5, it should be noted that when the bottom surface 12 of the support 10 is provided with both the first concave portion 14 and the second concave portion 18, the second concave portion 18 is provided in the bottom wall of the first concave portion 14, that is, the second concave portion 18 is formed by extending inward from a certain portion of the bottom wall of the first concave portion 14.

Referring to FIG. 6, in one embodiment, the biological test cassette further comprises a first rigid tube 71 provided between the first connecting tube 40 and the first flow channel 23, and the first connecting tube 40 is in communication with the first flow channel 23 through the first rigid tube 71. The cassette body 20 is provided with a first mounting hole 201, and the first rigid tube 71 is fixedly mounted in the first mounting hole 201

In addition, the biological test cassette further comprises a second rigid tube 72 provided between the second connecting tube 40 and the second flow channel 23, and the second connecting tube 50 is in communication with the second flow channel 32 through the second rigid tube 72. The chip 30 is provided with a second mounting hole 301, and the second rigid tube 72 is mounted in the second mounting hole 301.

Specifically, the first rigid tube 71 is fixed to the first mounting hole 201 by, for example, adhesive bonding. In addition, the second rigid tube 72 is fixed to the second mounting hole 301 by, for example, adhesive bonding. Thus, the first rigid tube 71 can facilitate the communication between the first connecting tube 40 and the first flow channel 23, and the first rigid tube 71 is fixed in position, which positions the end of the first connecting tube 40. Similarly, the second rigid tube 72 can facilitate the communication between the second connecting tube 50 and the second flow channel 32, and the second rigid tube 72 is fixed in position, which positions the end of the second connecting tube 50.

Figure 8:
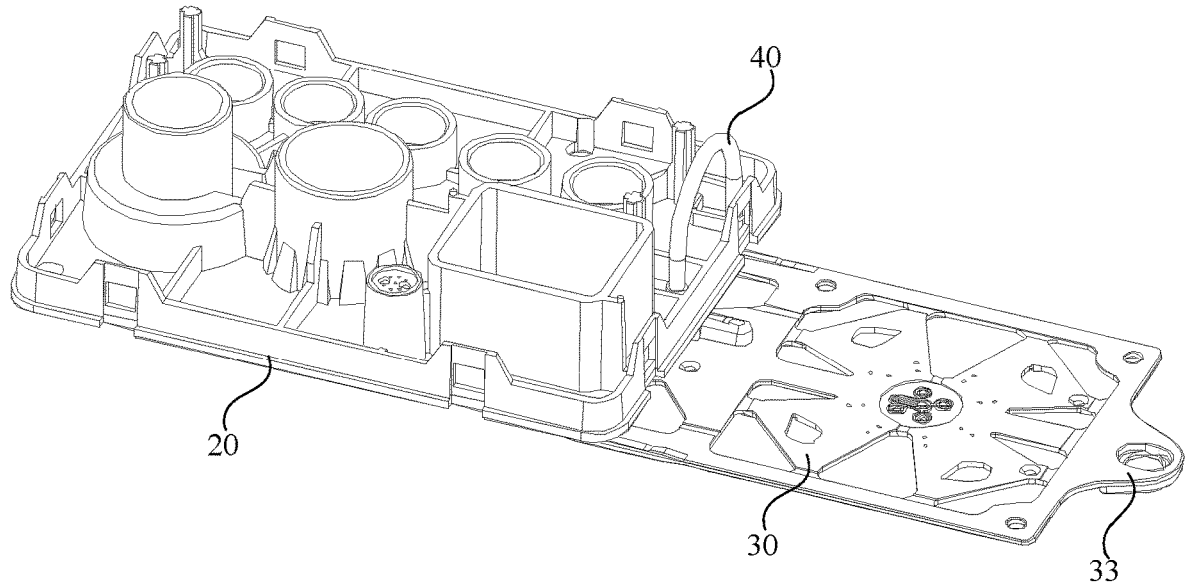
FIG. 8 is a structural diagram from another perspective of FIG. 7.

Referring to FIG. 6 to FIG. 8, FIG. 8 shows a structural diagram from another perspective of FIG. 7. Optionally, the first connecting tube 40 may be specifically a rigid tube or a flexible tube without limitation herein. In this embodiment, the first connecting tube 40 is, specifically, for example, a flexible tube and is curved, facilitating the connection of the first connecting tube 40 to the first rigid tube 71 and the second connecting tube 50 respectively.

Referring to FIGS. 1 and 2, in an embodiment, the biological test cassette further comprises an upper cover 80. The upper cover 80 covers the cassette body 20. Thus, after the upper cover 80 is placed on the cassette body 20, the upper cover 80 protects the cassette body 20, and can also fit with the cassette body 20 for some pretreatment operations in the cassette body 20. For example, a syringe can be provided on the upper cover 80, and the external pretreatment device can provide power by driving the action of the syringe so as to realize the transfer of the liquid in the pretreatment chamber 22.

Referring to FIG. 6, further, the cassette body 20 is fixed on the top surface 13 of the support 10 by, for example, engagement, and certainly, can be otherwise mounted on the support 10. In this embodiment, the support 10 is provided with at least one first engaging component 191, the cassette body 20 is provided with at least one first engaging hole 24, and the at least one first engaging component 191 is engaged and mounted in the at least one first engaging hole 24 in a one-to-one correspondence.

Referring to FIG. 5, further, the press cover 60 is fixed on the bottom surface 12 of the support 10 by, for example, engagement, and certainly, can be otherwise mounted on the support 10. In this embodiment, the press cover 60 is provided with at least one second engaging component 62, the support 10 is provided with at least one second engaging hole 192, and the at least one second engaging component 62 is engaged and mounted in the at least one second engaging hole 24 in a one-to-one correspondence.

Further, the upper cover 80 is provided on the cassette body 20 by, for example, engagement, and certainly, can be otherwise mounted on the cassette body 20. In this embodiment, the upper cover 80 is provided with at least one third engaging component, the cassette body 20 is provided with at least one third engaging hole, and the at least one third engaging component is engaged and mounted in the at least one third engaging hole in a one-to-one correspondence.

Referring to FIGS. 1 and 6, in one embodiment, a medical test system comprises a biological test cassette in any of the above-mentioned embodiments.

In the medical test system as described above, the chip 30, under push-pull driving action by an external driving device, can be slidably pulled out from the support 10. After the chip 30 is pulled out, a series of analysis and processing operations can be performed for the liquid in the analyzing and processing chamber 31 of the chip 30 by an external testing device. After the analysis and processing operations are completed, the chip 30 can also be slidably pushed back into the support 10, which can prevent the chip 30 from being exposed and damaged. Since the second flow channel 32 of the chip 30 and the first flow channel 23 of the cassette body 20 are communicated by the first connecting tube 40 and the second connecting tube 50, and the second connecting tube 50 is a flexible tube that is movable and bendable between the chip 30 and the support 10, the second connecting tube 50 can be freely bent and deformed accordingly during the process of pulling the chip 30 out from or pushes the chip 30 back into the support 10 by the driving device, not only satisfying the requirement for the chip 30 to be slidably pulled out from and pushed back into the support 10, but also ensuring that the second connecting tube 50 is unobstructed. Thus, the liquid in the first flow channel 23 can smoothly enter the second flow channel 32 and the analyzing and processing chamber 31 through the first connecting tube 40 and the second connecting tube 50.

It should be noted that the "first bump 16" can be "a part of the support 10", that is, the "first bump 16" is integrated with "other parts of the support 10" and can alternatively be an separated component that is separable from the "other parts of the support 10", that is, the "first bump 16" can be manufactured separably, and then assembled with the "other parts of the support 10".

It should be noted that the "second bump 34" can be "a part of the chip 30", that is, the "second bump 34" is integrated with "other parts of the chip 30"; the "second bump 34" can alternatively be an separated component that is separable from the "other parts of the chip 30", that is, the "second bump 34" can be manufactured separably, and then assembled with the "other parts of the chip 30" as a whole.

The technical features in the foregoing embodiments may be randomly combined. To make the description concise, not all possible combinations of the technical features in the foregoing embodiments are described. However, combinations of the technical features shall all be considered as falling within the scope described in this specification provided that the combinations of the technical features do not conflict with each other.

The foregoing embodiments only describe several implementations of this application, and are described in particular and in detail, but they shall not be construed as a limitation to the patent scope of this application. A person of ordinary skill in the art may further make variations and improvements without departing from the ideas of this application, which all fall within the protection scope of this application. Therefore, the protection scope of this application shall be subject to the appended claims.

In the description of the present disclosure, it should be understood that directions or location relationships indicated by terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential" are directions or location relationships shown based on the accompanying drawings, are merely used for the convenience of describing the present disclosure and simplifying the description, but are not used to indicate or imply that a device or an element must have a particular direction or must be constructed and operated in a particular direction, and therefore, cannot be understood as a limitation to the present disclosure.

In addition, terms "first" and "second" are adopted only for purposes of illustration, and may not be understood to indicate or imply relative importance or implicitly indicate the number of the indicated technical features. Therefore, the features limited by "first" and "second" may explicitly or implicitly include one or more such features. In the description of the present disclosure, "multiple" means at least two, for example, two and three, unless otherwise explicitly and specifically limited.

In the present disclosure, terms such as "installation", "connected", "connection", and "fixing" shall be understood in a broad sense unless otherwise expressly specified and defined, which for example, may be fixedly connected, detachably connected, or integrally formed; may be mechanically or electrically connected; may be directly connected or indirectly connected by using an intermediate medium; or may be communicated between the inners of two elements or interaction between two elements. For a person of ordinary skill in the art, specific meanings of the terms in the present disclosure may be understood based on a specific situation.

In the present disclosure, unless explicitly stated and defined otherwise, the first feature "above" or "below" the second feature may be that the first feature and the second feature are in direct contact, or that the first feature and the second feature are in indirect contact via an intermediate medium. Moreover, the first feature is "above", "on", and "over" the second feature may be that the first feature is directly above or obliquely above the second feature, or it only indicates that a horizontal height of the first feature is greater than the horizontal height of the second feature. The first feature is "below", "under", and "underneath" the second feature may be that the first feature may be directly below or obliquely below the second feature, or it may simply indicate that a horizontal height of the first feature is less than the horizontal height of the second feature.

It should be clearly stated that when an element is referred to as being "fixed to" or "disposed in" another element, it can be directly on the other element, or intervening elements may also exist. When an element is referred to as being "connected to" another element, it can be directly connected to the other element, or intervening elements may also exist. The terms "vertical", "horizontal", "upper", "lower", "left", "right" and similar expressions in this text are used for purpose of explanation only, and do not represent any unique embodiment.

What is claimed is:

1. A test cassette for analyzing a sample in fluid form, comprising:
    a support and a cassette body, wherein the support is provided with a first via hole, the cassette body is provided with a second via hole corresponding to the position of the first via hole, the cassette body is mounted on a top surface of the support, and the cassette body is further provided with a pretreatment chamber and a first flow channel in communication with the pretreatment chamber;

a chip, a first connecting tube and a second connecting tube, wherein the chip is slidably provided on a bottom surface of the support, the chip is provided with an analyzing and processing chamber and a second flow channel in communication with the analyzing and processing chamber, the first connecting tube is arranged through the first via hole and the second via hole, and has one end in communication with the first flow channel, and the other end in communication with one end of the second connecting tube, the second connecting tube is a flexible tube that is movable and bendable between the chip and the support, and has the other end in communication with the second flow channel.

2. The test cassette according to claim 1, wherein the bottom surface of the support is provided with a first concave portion, the first concave portion having a shape that is adapted to the shape of the chip and a side wall provided with a first movable port for the chip to slide out; the chip is provided with a docking portion that protrudes out of the first concave portion through the first movable port.

3. The test cassette according to claim 1, wherein the bottom surface of the support is provided with a first bump, the chip is provided with a second bump, and the first bump and/or the second bump are elastic bumps; when the chip is located at a starting position, the first bump abuts against and fits with the second bump to restrict the movement of the chip in the direction of pulling out.

4. The test cassette according to claim 3, wherein two first bumps and two second bumps are provided, the two second bumps being located on both sides of the chip respectively, and the two second bumps being arranged in a one-to-one correspondence with the two first bumps.

5. The test cassette according to claim 1, wherein the test cassette further comprises a press cover covering the chip and fitting with the bottom surface of the support to form a slot, and the chip is slidably disposed in the slot.

6. The test cassette according to claim 1, wherein the bottom surface of the support is provided with a second concave portion, and the second connecting tube is movable and bendable in the second concave portion.

7. The test cassette according to claim 6, wherein the second concave portion has a bottom wall provided with a boss; the boss is located on the bottom surface of the support at a side where the chip slides out; when the chip slides out to an end position, the boss resists against the second connecting tube.

8. The test cassette according to claim 1, wherein the test cassette further comprises a first rigid tube provided between the first connecting tube and the first flow channel, the first connecting tube is in communication with the first flow channel through the first rigid tube; the cassette body is provided with a first mounting hole, and the first rigid tube is fixedly mounted in the first mounting hole; and the test cassette further comprises a second rigid tube provided between the second connecting tube and the second flow channel, the second connecting tube is in communication with the second flow channel through the second rigid tube; the chip is provided with a second mounting hole, and the second rigid tube is mounted in the second mounting hole.

9. The test cassette according to claim 1, wherein the test cassette further comprises an upper cover covering the cassette body.

* * * * *